US012676835B2

(12) United States Patent (10) Patent No.: US 12,676,835 B2

Mohnani et al. (45) Date of Patent: Jul. 7, 2026

(54) METHOD TO MIGRATE WORKLOAD BETWEEN TWO ENVIRONMENTS AND A SYSTEM THEREOF

(71) Applicant: Red Hat, Inc., Raleigh, NC (US)

(72) Inventors: Urvashi Mohnani, Boston, MA (US); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 588 days.

(21) Appl. No.: 18/087,344

(22) Filed: Dec. 22, 2022

(65) Prior Publication Data

US 2024/0214357 A1 Jun. 27, 2024

(51) Int. Cl.
| | |
|---|---|
| *G06F 9/455* | (2018.01) |
| *G06F 9/48* | (2006.01) |
| *G06F 9/50* | (2006.01) |
| *H04L 9/40* | (2022.01) |

(52) U.S. Cl.
CPC ...... *H04L 63/0428* (2013.01); *G06F 9/45558* (2013.01); *G06F 9/4806* (2013.01); *H04L 63/166* (2013.01); *G06F 9/5077* (2013.01)

(58) Field of Classification Search
None
See application file for complete search history.

(56) References Cited

U.S. PATENT DOCUMENTS

| | | | |
|---|---|---|---|
| 9,501,330 | B2 | 11/2016 | McGrath et al. |
| 10,860,444 | B2 | 12/2020 | Natanzon |

| | | | | |
|---|---|---|---|---|
| 11,113,090 | B1 * | 9/2021 | Wilkinson | ............ G06F 9/5077 |
| 11,157,304 | B2 | 10/2021 | Watt, Jr. et al. | |
| 11,163,614 | B1 * | 11/2021 | Francisco | ............. G06F 9/5088 |
| 11,212,286 | B2 | 12/2021 | Schmitt et al. | |

(Continued)

FOREIGN PATENT DOCUMENTS

| | | |
|---|---|---|
| CN | 111279319 A | 6/2020 |
| CN | 112286640 A | 1/2021 |

OTHER PUBLICATIONS

Souza Junior, Paulo, et al.; "Good Shepherds Care For Their Cattle: Seamless Pod Migration in Geo-Distributed Kubernetes"; ICFEC 2022—6th IEEE International Conference on Fog and Edge Computing; May 2022, Taormina, Italy; pp. 1-9; hal-03587358. (10 pages.).

*Primary Examiner* — Abu Zar Ghaffari

(74) *Attorney, Agent, or Firm* — Kilpatrick Townsend & Stockton LLP

(57) ABSTRACT

A method to migrate workload between a single node environment and a multi-node environment over a Transport Layer Security (TLS) network, the method comprises running an application on a first machine in a first environment, wherein the first environment is any one of the environments. The method further comprises generating a first file for the application running on the first machine and storing the first file and the workload created from the first file in the first machine. The method further comprises accessing a second machine that runs a container cluster in a second environment, wherein the second environment is different from the first environment. The method further comprises reading a second file from the container cluster and storing the second file in the first machine. The method further comprises connecting the first machine to the container cluster of the second machine using access information stored in the second file.

18 Claims, 5 Drawing Sheets

(56)            References Cited

U.S. PATENT DOCUMENTS

| | | | |
|---|---|---|---|
| 11,281,492 | B1 * | 3/2022 | Rebeja .................. G06F 9/5077 |
| 2012/0307277 | A1 * | 12/2012 | Kishida ............. H04N 1/00244 |
| | | | 358/1.15 |
| 2018/0260578 | A1 * | 9/2018 | Orloff ................. G06F 21/6209 |
| 2019/0102157 | A1 | 4/2019 | Caldato et al. |
| 2019/0317825 | A1 * | 10/2019 | O'Neal ................ G06F 9/5044 |
| 2020/0153898 | A1 * | 5/2020 | Sabath .................. G06F 9/4856 |
| 2020/0177630 | A1 * | 6/2020 | Penner ............... H04L 63/1441 |
| 2020/0218701 | A1 * | 7/2020 | Ghidireac ............ G06F 16/137 |
| 2021/0019194 | A1 * | 1/2021 | Bahl ................... H04L 67/1031 |
| 2021/0240734 | A1 * | 8/2021 | Shah ........................ G06F 8/63 |
| 2022/0197680 | A1 * | 6/2022 | Rajadeva ............. G06F 21/602 |
| 2022/0229687 | A1 * | 7/2022 | Singhal ............... G06F 9/45558 |
| 2022/0326861 | A1 * | 10/2022 | Shachar ................ G06F 21/606 |
| 2023/0012930 | A1 * | 1/2023 | Gill ..................... H04L 67/1097 |
| 2023/0229359 | A1 * | 7/2023 | Pabón .................. G06F 3/0683 |
| | | | 711/154 |
| 2023/0325490 | A1 * | 10/2023 | Weizman ............. G06F 21/577 |
| | | | 726/7 |

* cited by examiner

First machine running in one environment

Server connecting the first machine and the second machine over the TLS network

Second machine working in another environment

METHOD TO MIGRATE WORKLOAD BETWEEN TWO ENVIRONMENTS AND A SYSTEM THEREOF

BACKGROUND

Running container clusters in a single node environment or a multi-node environment are two deployment strategies. Container orchestration platforms are known from prior art. For example, a Kubernetes system is one such container orchestration platform that manages containerized applications in a clustered environment. Such platforms help in managing various components of the container cluster, as those components are distributed across varied environments.

As data generation and data computation continue to increase, it is becoming important to manage increasing workload while utilizing fewer computational resources, like a Central Processing Unit (CPU), a Graphics Processing Unit (GPU), a Network Processing Unit, memory, network bandwidth, operating systems, databases, software, applications, development environment, etc.

Typically, a developer uses one environment to run a computer program or a computer application, for example, running an application only on a single node machine, or running a program on multiple machines connected in a single node environment. This arrangement provides advantage since not many resources are required for running the program. Likewise, there could be many reasons for deployment of workloads from the multi-node machine to the single node machine, for example, the situation when the load on the application does not warrant the massive infrastructure and ecosystem around it, and vice versa. It is known in prior art that applications running in one environment could be migrated into another environment; various methods of workload migration are known in prior art.

SUMMARY

The present disclosure provides a method to migrate workload between the single node environment and the multi-node environment. For instance, the present disclosure defines a method to migrate workload between the single node environment and the multi-node environment over a Transport Layer Security (TLS) network.

In an example, the method to migrate workload between the single node environment and the multi-node environment over the Transport Layer Security (TLS) network includes running an application on a first machine in a first environment. The first environment is any one of said environments. The method further includes generating a first file for the application running on the first machine and storing the first file and the workload created from the first file in the first machine, The method further includes accessing a second machine that runs a container cluster in a second environment, wherein the second environment is different from the first environment. The method further includes reading a second file from the container cluster and storing the second file in the first machine. The method further includes connecting the first machine to the container cluster of the second machine using access information stored in the second file.

In another example, the present disclosure provides a system to migrate workload between the single node environment and the multi-node environment over a Transport Layer Security (TLS) network. The system comprises a first machine running in a first environment, wherein the first environment is any one of said environments. The first machine comprises a processing unit configured to run an application and to generate a first file including the workload of the first file for the application. The first machine further comprises a memory unit configured to store the first file and the workload of the first file. The system further comprises a second machine configured to run a container cluster in a second environment. The second environment is different from the first environment. The first machine is connected to the container cluster of the second machine over the TLS network.

In another example, the present disclosure provides a non-transitory machine-readable medium storing code for migrating workload between the single node environment and the multi-node environment over a Transport Layer Security (TLS) network which, when executed by a computer system, cause the computer system to run an application on a first machine in a first environment. The non-transitory machine-readable medium storing code further causes the computer system to generate a first file for the application running on the first machine and store the first file and the workload created from the first file in the first machine. The non-transitory machine-readable medium storing code further causes the computer system to access a second machine that runs a container cluster in a second environment. The non-transitory machine-readable medium storing code further causes the computer system to read a second file from the container cluster and store the second file in the first machine. The non-transitory machine-readable medium storing code further causes the computer system to connect the first machine to the container cluster of the second machine using access information stored in the second file.

It is to be appreciated that all the aforementioned implementation defined in form of examples can be combined.

Additional features and advantages of the disclosed method, system and non-transitory machine-readable medium storing code are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
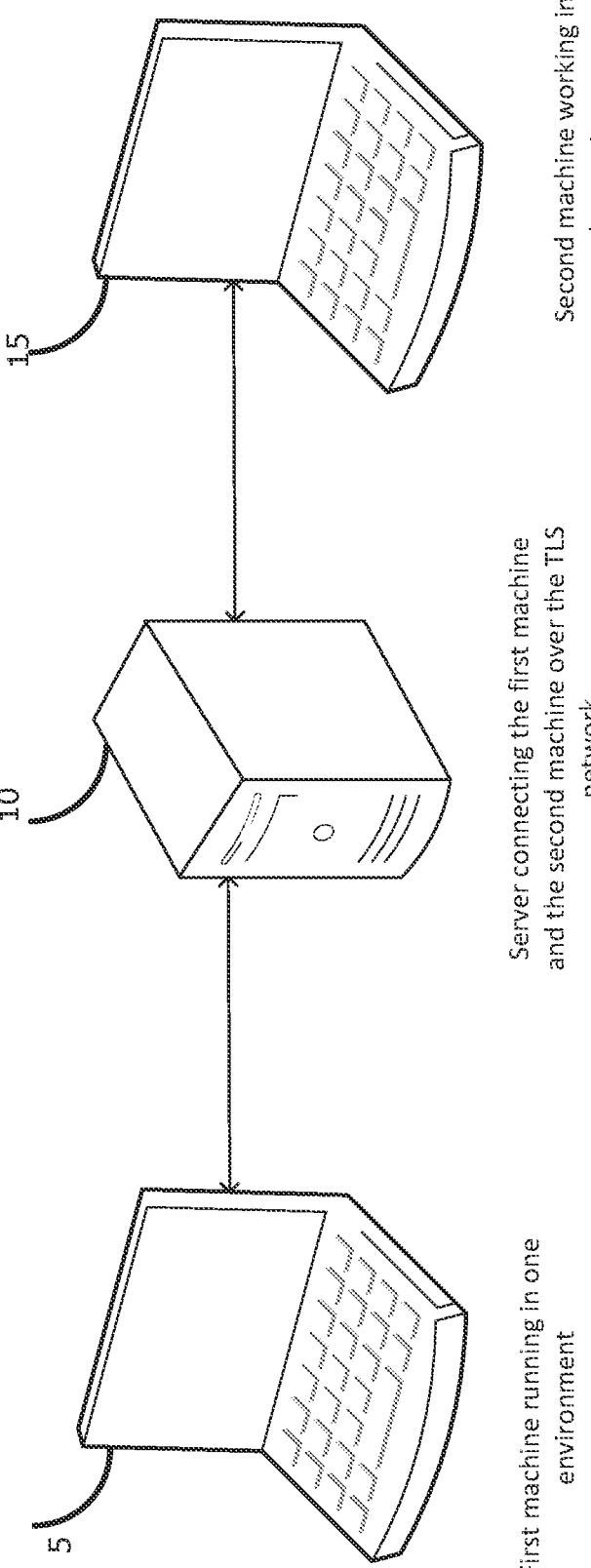
FIG. 1 is a block diagram of an example system for workload migration between two environments according to an embodiment of the present disclosure.

The present disclosure relates to a field of migrating workload between two environments. In particular, the present disclosure relates to a field of migrating workload between a single node environment and a multi-node environment. More particularly, the present disclosure relates to a method to migrate workload between the single node environment and the multi-node environment over a Transport Layer Security (TLS) network, and a system thereof. For instance, the present disclosure defines a method of migrating workload from a single node machine running in the single node environment to a multi-node machine running in the multi-node environment, or vice versa, over the Transport Layer Security (TLS) network, and a system thereof.

Computer applications running on a single node machine may suffer scale issues in comparison to applications running on a multi-node machine. Therefore, to manage the workload and to test the applications in every environment, it becomes important to migrate the workloads (or directly the application) from the single node machine to the multi-node machine. Likewise, for effective performance of applications, it is also important to migrate the workloads (or directly the application) from the multi-node machine to the single node machine. However, the workload migration from the single node machine to the multi-node machine, or vice versa, is a challenging task. In particular, the known container orchestration platforms when performing the task of deploying an application from one environment to another environment may encounter problems, like suffering a loss of data. For example, migrating workload from the single node environment to the multi-node environment, most commonly, involves downtime: while the application is being instantiated and deployed from the single node environment to the multi node environment, downtime could occur in any of the environments, which in-turn results in losing access to the application. Likewise, if the developer desires to migrate the application from the single node machine to the multi-node machine, it is prohibitive in terms of program performance, network latency, availability, reliability, security, computing resource utilization, power consumption, pricing, and other related factors. Therefore, it is a challenge for a user of a containerized ecosystem to manage workload of applications.

Another common problem faced during the workload migration is that the configurations of two environments are different from each other; users may in typical cases consider it as the biggest hindrance when trying to move over from the single node environment to the multi-node environment. In fact, deployment of workload from one environment to another environment is not as simple as lift and shift of the workloads into another environment. During manual deployment of the configurations from a single node environment to what is needed for a multi node environment, a high risk of incorrectly configuring the machines is involved.

Since migrating workloads from the single node environment to the multi-node environment, or vice versa, involves too much burden of high costs and indefinite amount of resources, including human administration, there exists a problem in prior art with respect to appropriately migrating workloads between two environments.

The present disclosure addresses the problem of migrating workload between the single node environment and the multi-node environment. In particular, the present disclosure solves the problem of migrating workload between the single node environment and the multi-node environment without involving any downtime. Further, the present disclosure accurately maps the configuration of the migrating workloads to make it more compatible with the deploying environment from its original environment. In particular, the present disclosure reduces the risk of incorrectly configuring machines at the time of migrating workload between the single node environment and the multi-node environment. That is, the present disclosure implements automatic transfer of workloads between the single node environment and the multi-node environment to avoid a need for manually configuring the machines. For instance, the present disclosure reduces the need for any manual configuration of machines from a single node environment to what is needed for a multi node environment.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or a step to be performed by external entities is not reflected in the description of a specific detailed element of that entity that performs that specific step or functionality, it should be clear for a skilled person that said methods and functionalities can be implemented in respective software, hardware elements or any kind of combination thereof. It will be appreciated that features of the present disclosure are susceptible to being combined in various combinations without departing from the scope of the present disclosure as defined by the appended claims.

Throughout the specification, the terms "machine", "first machine" or "second machine" refer to a machine, typically a laptop, a computer system or a workstation. Thus, the terms "machine", "first machine" or "second machine", "laptop", "workstation" are used as synonyms in the specification. These machines may be configured to operate differently in accordance with the embodiments defining the use of each of these terms. Likewise, the terms "environment", "first environment", "second environment" may refer to a network of single node machines, or a network of multi-node machines. Further, the terms "codes", "programs", "computer program", or "application" are interchangeable used.

The disclosure will now be described with the help of drawings. In particular, below paragraphs describe a method and a system of migrating workload between two environments according to different embodiments of the disclosure.

FIG. 1 is a block diagram of an example system (100) for workload migration between two environments according to an embodiment of the present disclosure. In some embodiments, the system (100) comprises a first machine (5) and a second machine (15). The first machine (5) may be configured to be connected with the second machine (15) over a network. Likewise, the second machine (15) may be configured to be connected with the first machine (5) over the network. In some embodiments, the network may be a Transport Layer Security (TLS) network.

In some embodiments, the system (100) may further comprise a server (10). The server (10) may be configured to connect the first machine (5) and the second machine (15). The server may be configured to form the secured communication network between the first machine (5) and the second machine (15). For example, the server may be configured to form the Transport Layer Security (TLS) network between the first machine (5) and the second machine (15).

In some embodiments, the first machine (5) may be configured to run an application in a single node environment. In some embodiments, the first machine (5) may be configured to run a plurality of applications in a single node environment. In some embodiments, the first machine (5) may be a computer or a laptop running the application. In some embodiments, the first machine (5) may be a set of computers or a set of laptops. In some embodiments, the first machine (5) may be a combination of a set of computers, laptops and/or workstations running the application in a single node environment.

In some embodiments, the single node environment may be an environment in which workloads and/or resources are distributed among other machines in the same cluster. The single node environment may also be referred to as a single node cluster, or a cluster. For example, if a downtime occurs in one machine, then the work and/or resources required for running the application are distributed among other machines operating in the same cluster. Some example tools that run applications in the single node environment includes Podman, Docker, etc.

In some embodiments, the second machine (15) may be configured to run the application in a multi-node environment. In some embodiments, the second machine (15) may be a computer or a laptop running the application in the multi-node environment. In some embodiments, the second machine (15) may be a set of computers or a set of laptops running the application in the multi-node environment. In some embodiments, the second machine (15) may be a combination of a set of computers, a set of laptops, and/or a set of workstations running the applications in the multi-node environment.

In some embodiments, the multi-node environment may be an environment in which workloads and/or resources are distributed among other machines in distributed clusters. The multi-node environment may also be referred to as a multi-node cluster. The multi-node environment may be running locally, in cloud or in a combination thereof. For example, the work and/or resources running the application are distributed among other machines connected in the multi-node cluster. Yet in another example, the multi-node cluster may form a master-slave connection among machines, where the master machines operate in one node and the slave machines operated in another node. Thus, applications running in the multi-node environment are connected to each other and can talk to each other. Some example tools that run applications in the multi-node environment include Kubernetes based orchestration tool. These tools are used to manage applications on multiple nodes, like Openshift, K3S.

Figure 2A:
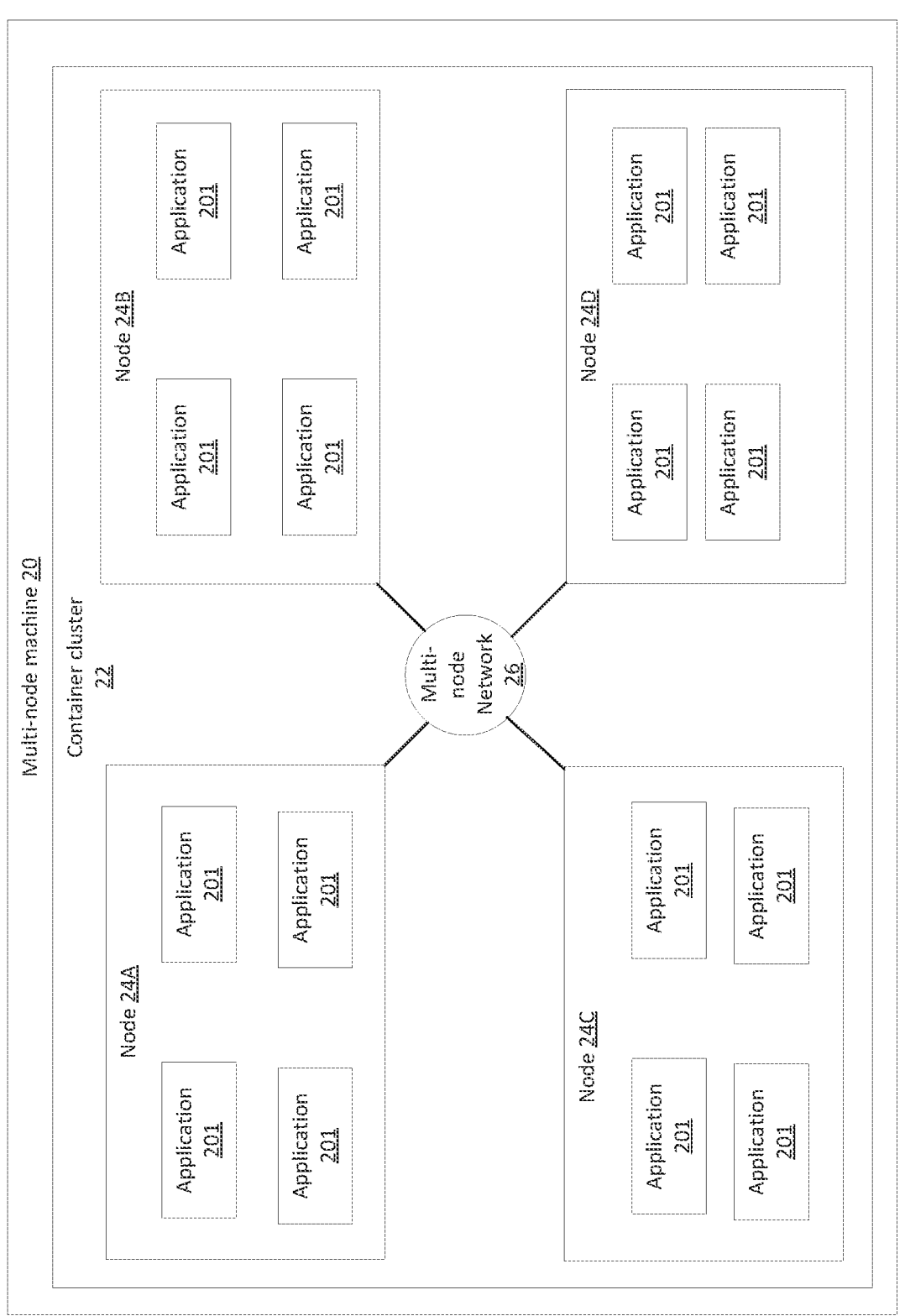
FIG. 2A is a block diagram of an example multi-node machine in a multi-node environment according to an embodiment of the present disclosure.

FIG. 2A is a block diagram of an example multi-node machine (20) in a multi-node environment according to an embodiment of the present disclosure. In some embodiments, at least one multi-node machine (20) operates in the multi-node environment. The multi-node machine (20) may be connected to a cluster of nodes or machines running the application (201). The cluster of nodes may be called a container cluster (22). In an example, the container cluster (22) may be formed of multi-nodes (24A, 24B, 24C, 24D). In some embodiments, the multi-nodes (24A, 24B, 24C, 24D) may be connected to each other either at the same level or at different levels within a network (26). In some embodiments, the network may be a multi-node network (26).

In some embodiments, the workloads of the application (201) may be distributed among multiple nodes (24A, 24B, 24C and 24D). In particular, the first node (24A), the second node (24B), the third node (24C) and the fourth node (24D)

run the same application (201) or different components of the same application (201) for its effective performance.

Figure 2B:
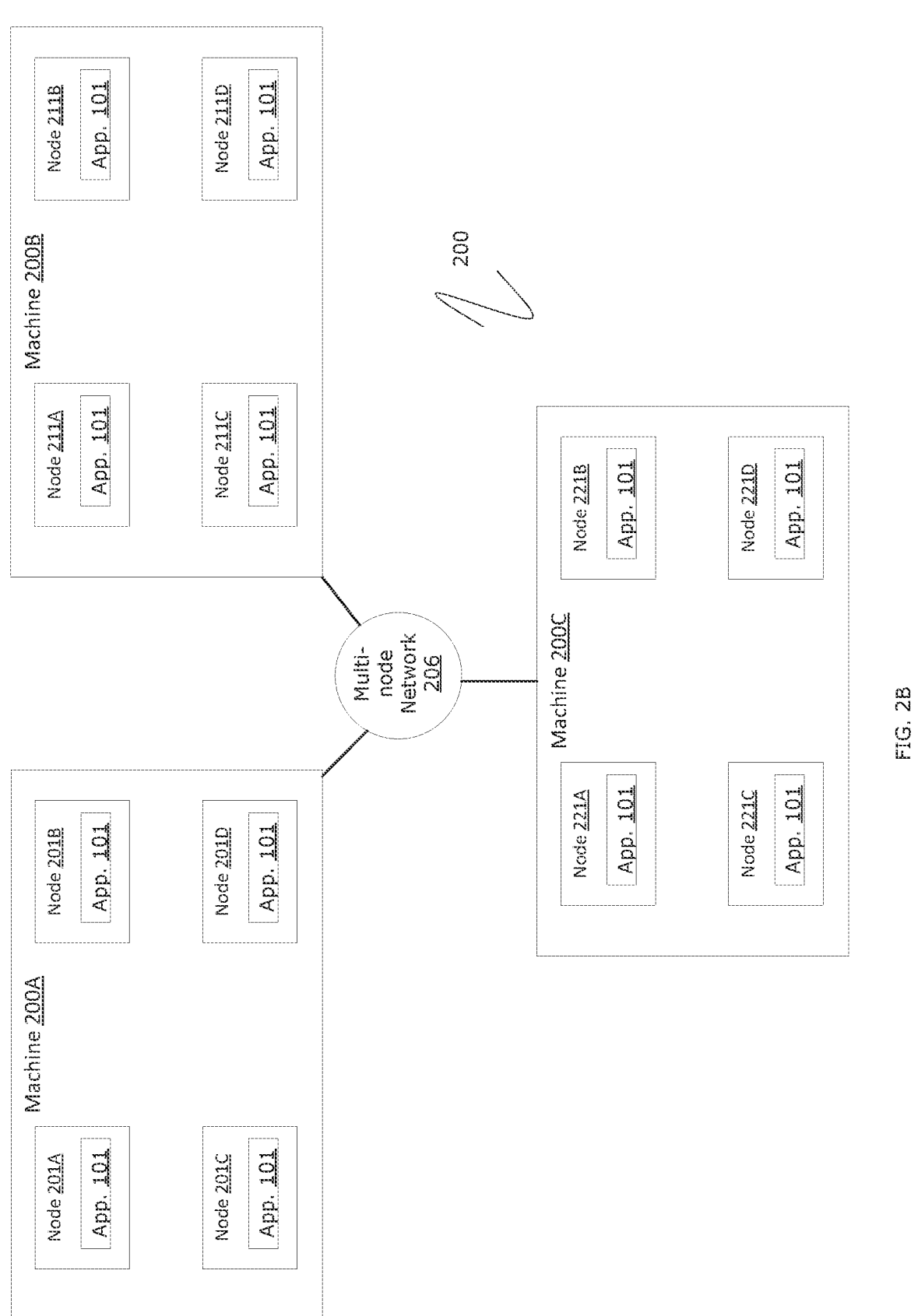
FIG. 2B is a block diagram of an example multi-node machine in a multi-node environment according to an embodiment of the present disclosure.

FIG. 2B is a block diagram of an example multi-node machine (200A, 200B, 200C) in a multi-node environment (200) according to an embodiment of the present disclosure. In some embodiments, a plurality of multi-node machines (200A, 200B, 200C) operates in the multi-node environment. In some embodiments, each of the multi-node machine (200A, 200B, 200C) may be connected to a cluster of nodes (201, 211, 221). For example, the first multi-node machine (200A) may comprise a container cluster formed of nodes (201A, 201B, 201C, 201D). Likewise, the second multi-node machine (200B) may comprise a container cluster formed of nodes (211A, 211B, 211C, 211D). In another example, the third multi-node machine (200C) may comprise a container cluster formed of a plurality of nodes (221A, 221B, 221C, 221D). For example, all machines (200A to 200C) and all nodes (201A to 221D) run the workloads of the same application (101) in the multi-node environment (200). It is within the scope of the present disclosure to have a various combination of the nodes and the machines running in one multi-node environment (200).

Figure 3:
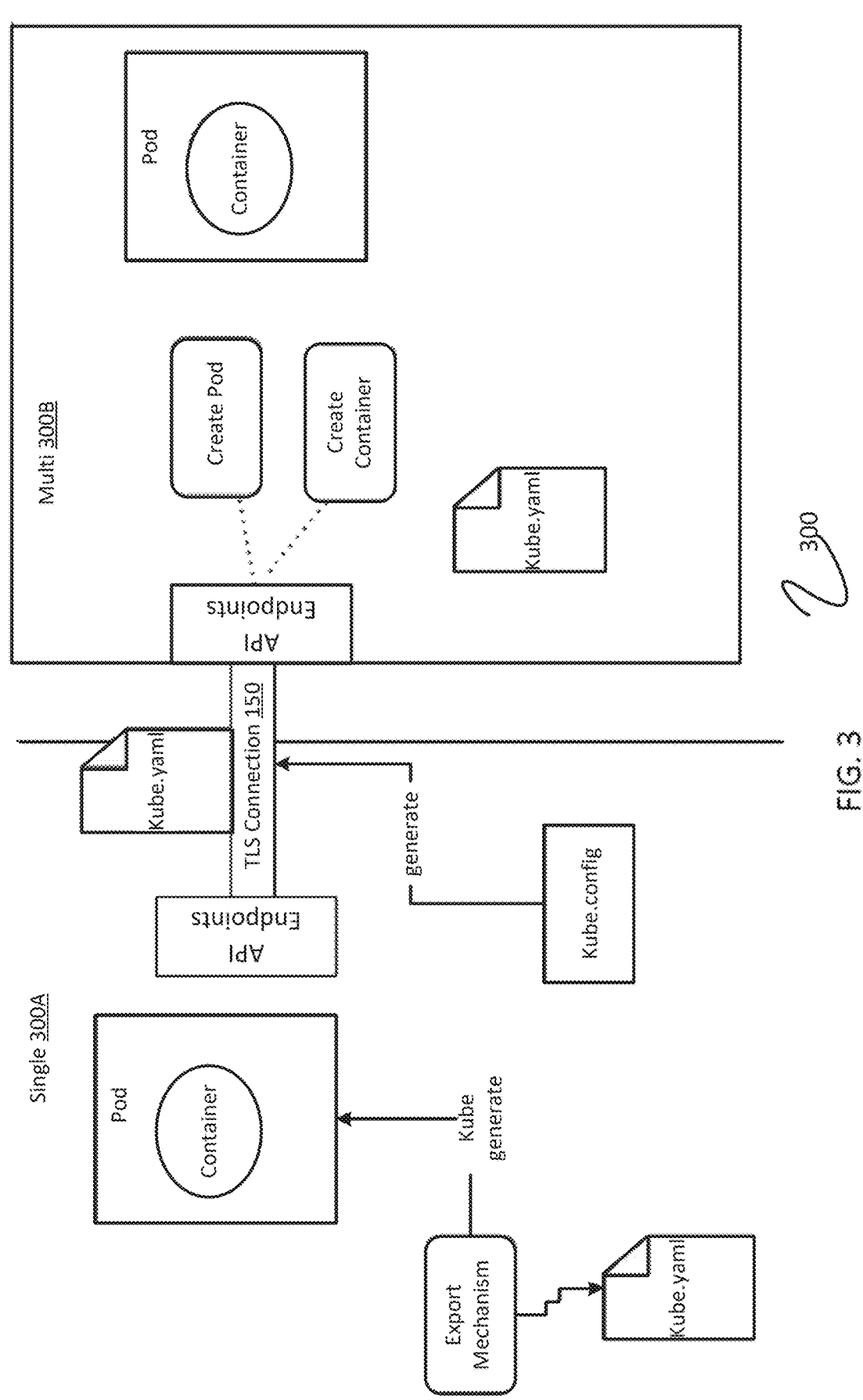
FIG. 3 is a block diagram of an example system for migrating workload between two environments according to an embodiment of the present disclosure.

FIG. 3 is a block diagram of an example system (300) for migrating workload between two environments (300A, 300B) according to an embodiment of the present disclosure. According to an embodiment of the present disclosure, the system (300) to migrate workload between the single node environment (300A) and the multi-node environment (300B) over the Transport Layer Security (TLS) network may comprise a first machine and a second machine.

In some embodiments, the first machine may be configured to run in a first environment. In some embodiments, the first environment is any one of the single node environment (300A) or the multi-node environment (300B). In some embodiments, the first machine is a single node machine and the first environment is the single node environment, and the second machine is a multi-node machine and the second environment is the multi-node environment. In some embodiments, the first machine is a multi-node machine and the first environment is the multi-node environment, and the second machine is a single node machine and the second environment is the single node environment.

In some embodiments, the first machine may comprise a processing unit. Examples of the processing unit may include, but are not limited to, a central processing unit, any electronic circuitry that executes instructions and performs input/output operations. In some embodiments, the processing unit may be configured to run an application. For example, the processing unit is configured to run the applications on the single node machine using the 'podman create' or 'podman run' commands. In some embodiments, the processing unit may be further configured to generate a first file of the application. In some embodiments, the processing unit may be further configured to generate the first file of the application, including the workload of the first file for the application. For example, a 'podman kube generate' command may be entered to automatically generate the kubernetes yaml (YAML Ain't Markup Language) file for the applications running on the single node machine. In some embodiments, the first machine may generate the first file based on the identification of the cluster ID to be deployed into the multi-node environment. For example, podman generates the kube yaml file based on the container or pod ID passed to it.

In some embodiments, the first machine may be configured to allow modifications in the first file. In some embodiments, the modifications in the first file may include manual modifications of the file configuration by a user. In some embodiments, the modifications in the first file may also include some addition, deletion or modification of some specific features of the file configuration by the user. These specific features may be required for accurately deploying the workloads of the first file from the first environment into the second environment. For example, a user may want to modify the generated kube yaml file if something changed for the multi node environment and/or if the user wants to enable a feature that is specific to the multi-node environment only.

In some embodiments, the first machine may further comprise a memory unit. Examples of the one or more memory unit may include, but are not limited to, a block storage system, a file storage system, an object storage system, or a combination thereof. In some embodiments, the memory unit may comprise a fast memory. In some embodiments, memory unit may comprise an expandable memory. In some embodiments, the memory unit may be configured to store the first file and/or the workload of the first file. For example, the memory unit may be configured to store the generated kubernetes yaml file on the single node machine.

In some embodiments, the system (300) may further comprise a second machine. In some embodiments, the second machine may be configured to run a container cluster. The container cluster may be a group of nodes as shown in FIG. 2A and FIG. 2B. In an example, the container cluster may be a set of nodes or machines configured to run containerized applications. In another example, the container cluster may include a Kubernetes cluster. In some embodiments, the second machine may be configured to run the container cluster in a second environment. The second environment is different from the first environment. That is, if the first environment is the single node environment (300A), then the second environment is the multi-node environment (300B). Likewise, if the first environment is the multi-node environment (300B), then the second environment is the single node environment (300A).

In some embodiments, the system (300) may further comprise a server. In some embodiments, the server may be configured to access the second machine running the container cluster. In some embodiments, the server may be further configured to read a second file from the container cluster and store the second file in the first machine. In some embodiments, the server may be configured to extract access information from the second file. In some embodiments, the access information in the second file comprises information including at least one of a cluster's server address, TLS keys, certificates, or keys effectively required to connect into the cluster, which is needed to connect to the container cluster. In some embodiments, the server may be configured to extract access information from the second file to create the TLS network. For example, a 'kubeconfig' file is present with every kubernetes cluster, and 'kubeconfig' file includes information like keys, certificates, and authentication for the cluster. The 'kubeconfig' file holds the authentication and keys needed to connect to the cluster.

In some embodiments, the server may be further configured to connect the first machine to the container cluster running in the second machine using the access information stored in the second file. At least one effect of extracting the access information of the second file could be of connecting the first machine to the container cluster of the second machine for enabling secured communication between the two environments. For example, a 'podman kube apply' command reads the kubeconfig file to grab the keys, certificates, and authentication to connect to the kubernetes cluster running in a multi-node environment. A TLS connection is created with this information. In further example, podman uses the kubeconfig file to connect to the cluster.

In some embodiments, the TLS network is established between the first machine and the container cluster of the second machine to initiate communication between the first machine and the container cluster.

In some embodiments, the extracted information from the second file comprises access information of the container cluster and the API bundle information of the container cluster. In some embodiments, the extracted information allows accessing the API bundle information of the container cluster over the TLS network. In some embodiments, the container cluster contains a bunch of endpoints for their API. These endpoints are addresses or functions that create a container, or delete a container, delete a pod to name a few. The API endpoints of the cluster allowed modifications in the container cluster.

In some embodiments, the extracted information allows passing the relevant nuances for the target deployment directly to the second machine. In some embodiments, the TLS connection is configured to create a bridge to abstract the equivalent entities from the first machine and map them to the equivalent API end points on the second machine. For example, the TLS connection is configured to create a bridge to abstract the equivalent entities from the single node machine and map them to the equivalent API end points on the multi-node machine. For example, the kubernetes API has endpoints that can be curled to fulfill requests in a kubernetes cluster. The 'podman kube apply' command uses this endpoint to create the workloads from the generated kube yaml file. This is done via HTTP requests using the TLS connection. In one example, the podman tool uses the kubeconfig file to connect to the cluster and then to deploy the generated kube yaml file in the multi node environment.

In some embodiments, the server may be configured to split the first file by object type. In some embodiments, the server may be configured to split the workload of the first file by object type. For example, the yaml file may be split into various components or workloads for deploying into the other environment. In some embodiments, the server may be further configured to send each object information to the container cluster. In some embodiments, the server may be further configured to create the workload in the second machine from the object information received by the container cluster. In some embodiments, the server may be further configured to create the object in the second machine from the object information received by the container cluster.

In some embodiments, the server may be configured to read the first file, break the first file into various object types defined in the first file, i.e. pod, container, volume, network, etc., and create the workloads in the container cluster based on the way it is written/defined in the first file. For example, the system includes reading the yaml file, breaking down the yaml file into various kubernetes types defined in the yaml, i.e. pod, container, volume, network, etc., and creating the workloads in the container cluster based on the way it is written/defined in the yaml file. In further example, the kubernetes yaml workloads are split by object type and each object information is sent to the kubernetes API via the HTTP and TLS connections using the API endpoints.

In some embodiments, the server may be configured to send a response from the container cluster. In some embodiments, the response from the container cluster includes information about a success or a failure of creating the workloads in the second machine from the object information received by the container cluster. In some embodiments, the response from the container cluster includes information about a success or a failure of creating the object in the second machine from the object information received by the container cluster.

According to one embodiment of the disclosure, the processing unit of the first machine may be configured to generate a first file based on the application running in the first environment. In order to deploy this first file in the container cluster of the second machine, a processing unit in the second environment is configured to extract a second file from the container cluster. The processing unit also extracts an Application Programming Interface (API) bundle for accessing the container cluster. The effect of extracting the second file is that the information related to the server address, client key, access key, authorization etc. of the container cluster is extracted. This information is used to create a TLS network/connection between the first machine and the container cluster. This way the workload from the single node machine is migrated into the container cluster running in the multi-node environment, or vice versa.

In an alternative embodiment, the system (300) for migrating workload between two environments (300A, 300B) uses the container ID of the application running in the first environment. That is, a user can simply enter a container ID, container name, pod ID and/or pod name, or any combination thereof, to the first machine, while the first file may be generated in the background and be pushed to the multi node environment without the user even seeing the generated first file. For example, the user can simply pass a container or pod ID/name to podman and the kube yaml file will be generated in the background and be pushed to the multi node environment without the user even seeing the generated kube yaml file. In another example, a container called "mycontainer" running on the single node machine needs to be deployed to the multi-node machine, the user uses the command "podman kube apply --kubeconfig/path/to/kubeconfig mycontainer" and it will deploy the "mycontainer" onto the multi node cluster environment.

Figure 4:
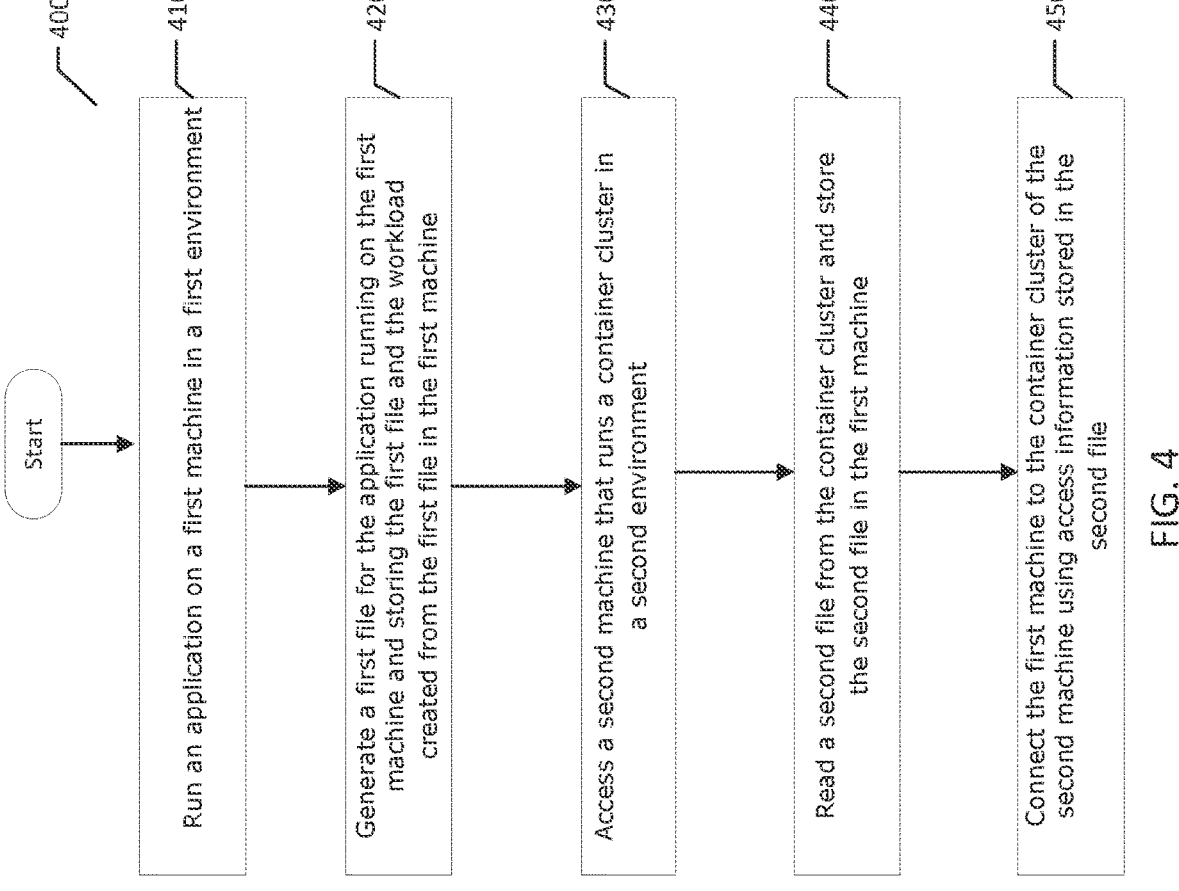
FIG. 4 is a flowchart illustrating an example method for migrating workload between two environments according to an embodiment of the present disclosure.

FIG. 4 is a flowchart illustrating an example method (400) for migrating workloads between two environments according to an embodiment of the present disclosure. In some embodiments, the workload migration between a single node environment and a multi-node environment may take place over a network that provides communication security. For example, the workload migration between a single node environment and a multi-node environment may take place over a Transport Layer Security (TLS) network. In some embodiments, the workload migration between a single node environment and a multi-node environment may take place over a server, and the server may be configured to transmit data securely.

In some embodiments, the method (400) may comprise running an application on a first machine in a first environment (410). For example, the method includes running the application on the single node machine by entering the 'podman create' or 'podman run' commands. In some embodiments, the first environment may be the single node environment. In some embodiments, the first environment may be the multi-node environment. For example, the first environment may be any one of the single node environment or the multi-node environment.

In some embodiments, the method (400) may further comprise generating a first file for the application running on the first machine (420). For example, the first file may comprise configuration files and/or data for storage and transmittal of workload of the application from the first machine. In some embodiments, the first file may carry myriad parameters, options, settings and/or preferences of the application from the first machine for workload migration. In one example, the first file may be a configuration file of the application or the workloads of the application. In another example, the first file may be a YAML file. For instance, the first file may be generated by entering a 'podman kube generate' command that takes in information about the existing environment such as pods, containers, and volumes of the application. The 'podman kube generate' creates a kubernetes YAML file from the configuration of those podman objects (or called a kube.yaml).

In some embodiments, the generating the first file may comprise modifying the first file to include some specific features by the user. These specific features may be required for accurately deploying the workloads of the first file from the first environment into the second environment. For example, a user may want to modify the generated kube yaml file if something changed for the multi node environment and/or if the user wants to enable a feature that is specific to the multi-node environment only etc.

In some embodiments, the method (400) may further comprise storing the first file in the first machine (420). In some embodiments, the method further comprises decomposing the first file into object types. Each object information may be stored in the first machine for workload transition.

In some embodiments, the method (400) may further comprise accessing a second machine. In some embodiments, the method (400) may further comprise accessing the second machine that runs the container cluster (430). For example, accessing the second machine that runs the kubernetes cluster. According to an embodiment of the disclosure, if the first machine is the single node machine, then the second machine is the multi-node machine. In alternative embodiment, if the first machine is the multi-node machine, then the second machine is the single node machine.

In some embodiments, the method (400) may further comprise reading a second file from the container cluster (440). In some embodiments, the second file may comprise access information for connecting the first machine to the second machine. In some embodiments, the access information may comprise information from the second machine and/or information of the container cluster running on the second machine. In some embodiments, the access information may comprise information that includes at least one of a cluster's server address, TLS keys, certificates, or authentication for the cluster. In some embodiments, the access information may comprise all information as needed to connect to the container cluster. In one example, the second file may include a kubernig file. In another example, the second file is a 'kubeconfig' file obtained from a Kubernetes cluster. For instance, every kubernetes cluster includes a 'kubeconfig' file that has information like keys, certificates, and authentication for the cluster.

In some embodiments, the method (400) may further comprise storing the second file (440). In some embodiments, the method may further comprise storing the second file in the first machine. For instance, the method includes checking the first machine if the second file is already stored on the first machine. If it is determined that the second file is not stored in the first machine, the method includes storing a copy of the second file on the first machine. for example, if the single node machine does not have a 'kubeconfig' file as accessed from the kubernetes cluster, the method includes storing the 'kubeconfig' file in the single node machine.

In some embodiments, the method comprises extracting the access information stored in the second file. In some embodiments, the method further comprises reading the extracted information. For example, the 'podman kube apply' command reads the 'kubeconfig' file to access the keys, certificates, and authentication to connect to the kubernetes cluster running in a multi-node environment. In this example, this information may be enough to create the TLS connection. In some embodiments, the method may further comprise extracting the Application Programming Interface (API) bundles from the second file. For instance, the API bundle extraction takes place to extract the core kubernetes capabilities. In particular, every kubernetes based cluster will have a 'kubeconfig file' that holds the cluster's server address, client TLS keys and certificates, and CA certificates needed to connect to the cluster.

In some embodiments, the method further comprises connecting the first machine and the container cluster of the second machine using access information stored in the second file (450). In some embodiments, the method further comprises initiating communication between the first machine and the container cluster of the second machine. In some embodiments, the method further comprises initiating communication between the first machine and the container cluster of the second machine over a network formed on the basis of the file configurations received from the second file. In some embodiments, the network is a TLS network.

The method includes sending information about the creation of workloads in the container cluster over the TLS connection allows to instantiate the previously single node environment accurately in the multi node environment without needing to change client tools.

In some embodiment, in order to enable the flow of workloads between the first machine and the container cluster of the second machine, the method comprises curling the API endpoints of the container cluster to fulfill requests in the container cluster. For example, curling the kubernetes API endpoints to fulfill requests in the kubernetes cluster as the 'podman kube apply' command uses this endpoint to create the workloads from the generated kube yaml file. In some embodiments, the target deployment may take place via HTTP requests using the TLS connection.

For example, as illustrated in FIG. 3, the Kubernetes codebase has an API that can be used to communicate with a cluster. That is, kubernetes API endpoints that match the kubernetes types decomposed from the kube yaml allows podman to talk to kubernetes telling it what workloads to create in the kubernetes cluster when moving from the single node environment to the multi node environment. In another example, taking the API bundle, the method comprises decomposing the kube.yaml file and interfacing with the Podman APIs to abstract the workloads from Podman and interfacing with the equivalent API endpoint provided by the Kubernetes cluster. At least one effect could be that migrating workload between two environments reduces a chance of any downtime.

In some embodiments, the method (400) includes breaking the first file into various components or objects that define its pod, container, volume, network, etc. to meet the access point information provided by the API bundle. In some embodiments, the information of the various components obtained from the first file is used to create workloads in the container cluster.

In some embodiments, the method includes sending information to the second machine about what workloads to create in the container cluster when moving the workload from the first environment to the second environment. The communication from the first machine to the second machine takes place through the API endpoints of the container cluster of the second machine. That is, the API endpoints of the container cluster that match the object type of the first file allows the first machine to communicate with the container cluster. In some embodiments, the method further comprises sending each object information to the container cluster after establishing the communication between the first machine and the container cluster of the second machine.

In some embodiments, the method further comprises creating the workload in the second machine. In some embodiments, the method further comprises creating the workload in the second machine based on the object information obtained after breaking the first file into various components. In some embodiments, the method further comprises creating the workload in the second machine based on the object information received by the container cluster. The container cluster receives information about creating the workloads for the object information from the first file when migrating workload from the first machine to the second machine.

In some embodiments, the method further comprises sending a response from the container cluster to the first machine. In some embodiments, the method further comprises sending a response from the container cluster including information about a success or a failure of creating the object or the workload in the second machine. In some embodiments, the method further comprises sending a response from the container cluster including information about a success or a failure of creating the object/workloads in the second machine based on the object information received by the container cluster. For example, upon receiving the object information, kubernetes cluster attempts to create the objects and sends a response back about a success or a failure of creating the object in the kubernetes cluster.

In an alternative embodiment, the method (400) for migrating workload between two environments (300A, 300B) uses the container ID of the application running in the first environment. The method includes entering a container ID, container name, pod ID and/or pod name, or any combination thereof, to the first machine. The first file may be generated in the background and be pushed to the multi node environment without the user even seeing the generated first file. For example, the user can simply pass a container or pod ID/name to podman and the kube yaml file will be generated in the background and be pushed to the multi node environment without the user even seeing the generated kube yaml file. In another example, a container called "mycontainer" running on the single node machine needs to be deployed to the multi-node machine, the user uses the command "podman kube apply --kubeconfig/path/to/kubeconfig mycontainer" and it will deploy the "mycontainer" onto the multi node cluster environment.

According to an embodiment of the present disclosure, a non-transitory machine-readable medium storing code for migrating workload between a single node environment and a multi-node environment over a Transport Layer Security (TLS) network is disclosed.

In some embodiments, the non-transitory machine-readable medium storing code which, when executed by a computer system, cause the computer system to run an application on a first machine in a first environment. In some embodiments, the non-transitory machine-readable medium storing code which, when executed by a computer system, cause the computer system to generate a first file for the application running on the first machine and store the first file and the workload created from the first file in the first machine. In some embodiments, the non-transitory machine-readable medium storing code which, when executed by a computer system, cause the computer system to access a second machine that runs a container cluster in a second environment. In some embodiments, the non-transitory machine-readable medium storing code which, when executed by a computer system, cause the computer system to read a second file from the container cluster and store the second file in the first machine. In some embodiments, the non-transitory machine-readable medium storing code which, when executed by a computer system, cause the computer system to connect the first machine to the container cluster of the second machine using access information stored in the second file.

In some embodiments, the non-transitory machine-readable medium storing code which, when executed by a computer system, cause the computer system to extract and read the access information stored in the second file to create the TLS network. In some embodiments, the non-transitory machine-readable medium storing code which, when executed by a computer system, cause the computer system to split the first file by object type. In some embodiments, the non-transitory machine-readable medium storing code which, when executed by a computer system, cause the computer system to send each object information to the container cluster to create the workload in the container cluster. In some embodiments, the non-transitory machine-readable medium storing code which, when executed by a computer system, cause the computer system to create the object in the second machine from the object information received by the container cluster.

The disclosure enables the user to deploy the application running on a single node machine directly to a multi node environment without changing their toolset. Likewise, the disclosure enables the user to deploy the application running on a multiple node machine directly to a single node environment without changing their toolset and with reduced possibility of downtime. A final benefit of this could be the potential for a tool like Podman to become a control plane for multiple Kuberentes clusters allowing for a Continuous Delivery style capability by leveraging the developer flow outlined in the embodiment.

The disclosure is claimed as follows:

1. A method to migrate a workload between a single node environment and a multi-node environment over a Transport Layer Security (TLS) network, wherein the single node environment has a single physical machine, and wherein the multi-node environment has two or more interconnected physical nodes, the method comprising:

deploying, by a first machine, a container in the single node environment, wherein the container is configured to execute the workload;

after deploying the container, generating, by the first machine, a first file storing configuration data associated with the workload executed in the container on the first machine, wherein the configuration data identifies a plurality of objects and a plurality of object types used in relation to the workload;

accessing, by a server that is separate from the first machine, a second machine that runs a container cluster in the multi-node environment, wherein the server is also separate from the second machine;

reading, by the server, access information for the container cluster from a second file of the container cluster and providing the access information to the first machine, wherein the access information is information needed to connect to the container cluster;

after receiving the access information, establishing, by the first machine, a TLS connection over the TLS network with the container cluster of the second machine using the access information; and after the TLS connection is established between the first machine and the second machine over the TLS network, facilitating migration of the workload from the single node environment to the multi-node environment via the TLS network based on the configuration data stored in the first file, wherein facilitating the migration involves:

parsing the first file to determine the plurality of objects and the plurality of object types identified in the configuration data;

for each object type of the plurality of object types, transmitting a corresponding command to a corresponding application programming interface (API) endpoint of the container cluster to create the object type in the container cluster of the multi-node environment for use in running the workload in the multi-node environment; and for each object in the plurality of objects, sending corresponding object information to the container cluster, wherein the container cluster is configured to use the object information to create a corresponding object in the container cluster for use in running the workload in the multi-node environment.

2. The method of claim 1, wherein the access information in the second file comprises information including at least one of a server address, TLS keys, certificates, or authentication for the container cluster, which is needed to connect to the container cluster.

3. The method of claim 1, wherein the first file lists the plurality of objects involved in the workload.

4. The method of claim 1, further comprising:

for each object type of the plurality of object types, creating the object type in the second machine based on the corresponding command received by the container cluster at the corresponding API endpoint.

5. The method of claim 4, further comprising:

for each object type of the plurality of object types, sending, by the container cluster, a response to the first machine or the server including information about a success or a failure of creating the object type on the second machine based on the corresponding command received by the container cluster.

6. The method of claim 1, wherein the first file includes a YAML Ain't Markup Language (YAML) file.

7. The method of claim 1, wherein the container cluster includes a container orchestration platform, and wherein the plurality of object types are types of virtual objects deployed by the container orchestration platform.

8. The method of claim 1, wherein the configuration data includes parameters, options, and/or settings of the workload.

9. The method of claim 1, further comprising:

after generating the first file, and prior to performing the migration, modifying the first file to generate a modified first file; and using the modified first file in performing the migration.

10. The method of claim 1, wherein the second file includes API endpoint information for the container cluster, and further comprising:

receiving, by the first machine, the second file;

storing, by the first machine, the second file;

extracting, by the first machine, the API endpoint information from the second file; and determining, by the first machine, the API endpoint to which to transmit each corresponding command for each object type of the plurality of object types using the API endpoint information extracted from the second file.

11. A system to migrate a workload between a single node environment and a multi-node environment over a Transport Layer Security (TLS) network, wherein the single node environment has a single physical machine, and wherein the multi-node environment has two or more interconnected physical nodes, the system comprising:

a first machine running in a first environment, wherein the first environment is the single node environment, the first machine comprising a processing unit comprising processing hardware configured to:

deploy a container in the single node environment, wherein the container is configured to execute the workload; and after deploying the container, generate a first file storing configuration data associated with the workload executed in the container on the first machine, wherein the configuration data identifies a plurality of objects and a plurality of object types used in relation to the workload;

a second machine configured to run a container cluster in the multi-node environment; and a server that is separate from the first machine and the second machine, wherein the server is configured to:

access the second machine running the container cluster;

read access information for the container cluster from a second file of the container cluster and provide the access information to the first machine, wherein the access information is information needed to connect to the container cluster of the second machine;

establish a TLS connection over the TLS network between the first machine and the container cluster of the second machine using the access information; and after the TLS connection is established between the first machine and the second machine over the TLS network, facilitate migration of the workload from the single node environment to the multi-node environment via the TLS network based on the configuration data stored in the first file, wherein facilitating the migration involves:

parsing the first file to determine the plurality of objects and the plurality of object types identified in the configuration data;

for each object type of the plurality of object types, transmitting a corresponding command to a corresponding application programming interface (API) endpoint of the container cluster to create the object type in the container cluster of the multi-node environment for use in running the workload in the multi-node environment; and for each object in the plurality of objects, sending corresponding object information to the container cluster, where in the container cluster is configured to use the object information to create a corresponding object in the container cluster for use in running the workload in the multi-node environment.

12. The system of claim 11, wherein the server is configured to:

for each object of the plurality of objects identified in the first file:

forward a response from the container cluster to the first machine indicating a success or a failure of creating the object in the container cluster based on the corresponding object information received by the container cluster.

13. The system of claim 11, wherein the access information in the second file comprises information including at least one of a server address, TLS keys, certificates, or authentication for the container cluster, which is needed to connect to the container cluster.

14. A non-transitory machine-readable medium storing code for migrating a workload between a first environment and a second environment over a Transport Layer Security (TLS) network, wherein the code is executable by one or more processors for causing the one or more processors to perform operations including:

deploying, by a first machine, a container in the first environment, wherein the container is configured to execute the workload;

after deploying the container, generating, by the first machine, a first file storing configuration data associated with the workload executed in the container on the first machine, wherein the configuration data identifies a plurality of objects and a plurality of object types used in relation to the workload;

accessing, by a server that is separate from the first machine, a second machine that runs a container cluster in the second environment, wherein the server is also separate from the second machine;

reading, by the server, access information for the container cluster from a second file of the container cluster and providing the access information to the first machine, wherein the access information is information needed to connect to the container cluster;

after receiving the access information, establishing, by the first machine, a TLS connection over the TLS network with the container cluster of the second machine using the access information; and after the TLS connection is established between the first machine and the second machine over the TLS network, facilitating migration of the workload from the first environment to the second environment via the TLS network based on the configuration data stored in the first file, wherein facilitating the migration involves:

parsing the first file to determine the plurality of objects and the plurality of object types identified in the configuration data;

for each object type of the plurality of object types, transmitting a corresponding command to a corresponding application programming interface (API) endpoint of the container cluster to create the object type in the container cluster of the second environment for use in running the workload in the second environment; and for each object in the plurality of objects, sending corresponding object information to the container cluster, wherein the container cluster is configured to use the object information to create a corresponding object in the container cluster for use in running the workload in the second environment.

15. The non-transitory machine-readable medium of claim 14, wherein the access information in the second file comprises information including at least one of a server address, TLS keys, certificates, or authentication for the container cluster, which is needed to connect to the container cluster.

16. The non-transitory machine-readable medium of claim 14, wherein the configuration data includes parameters, options, and/or settings of the workload.

17. The non-transitory machine-readable medium of claim 14, wherein the first file lists the plurality of objects involved in the workload.

18. The non-transitory machine-readable medium of claim 14, wherein the operations further involve:

for each object type of the plurality of object types, creating the object type in the second machine based on the corresponding command received by the container cluster at the corresponding API endpoint.

* * * * *